US006778697B1

(12) United States Patent
Shin et al.

(10) Patent No.: US 6,778,697 B1
(45) Date of Patent: Aug. 17, 2004

(54) COLOR IMAGE PROCESSING METHOD AND APPARATUS THEREOF

(75) Inventors: Hyun-doo Shin, Sungnam (KR); Yang-lim Choi, Paldal-gu (KR); Yining Deng, Santa Barbara, CA (US); Bangalore S. Manjunath, Santa Barbara, CA (US)

(73) Assignees: Samsung Electronics Co., Ltd., Kyungki-Do (KR); The Regents of the University of California, Oakland, CA (US)

( * ) Notice: Subject to any disclaimer, the term of this patent is extended or adjusted under 35 U.S.C. 154(b) by 0 days.

(21) Appl. No.: 09/497,519

(22) Filed: Feb. 4, 2000

Related U.S. Application Data
(60) Provisional application No. 60/118,742, filed on Feb. 5, 1999.

(51) Int. Cl.[7] .................................................. G06K 9/00
(52) U.S. Cl. ........................................ 382/164; 382/305
(58) Field of Search ......................... 382/162, 163–166, 382/173, 190, 199, 195, 209, 305, 260–266, 217–220, 251, 253; 707/1–6, 104.1; 358/515–520

(56) References Cited

U.S. PATENT DOCUMENTS

| | | | | |
|---|---|---|---|---|
| 5,047,842 A | | 9/1991 | Bouman, Jr. et al. ....... | 358/515 |
| 5,598,482 A | * | 1/1997 | Balasubramanian et al. .......................... | 382/199 |
| 6,028,957 A | * | 2/2000 | Katori et al. ................ | 382/162 |
| 6,154,572 A | * | 11/2000 | Chaddha ...................... | 382/253 |
| 6,373,979 B1 | * | 4/2002 | Wang .......................... | 382/165 |
| 6,411,953 B1 | * | 6/2002 | Ganapathy et al. ............ | 707/6 |
| 6,519,360 B1 | * | 2/2003 | Tanaka ........................ | 382/162 |

FOREIGN PATENT DOCUMENTS

| | | | | |
|---|---|---|---|---|
| JP | 5-344336 | 8/1993 | | |
| JP | 5-266091 | 10/1993 | ........... | G06F/15/40 |
| JP | 5-274372 | 10/1993 | | |
| JP | 6-318256 | 11/1994 | ........... | G06F/15/70 |
| JP | 8-16789 | 1/1996 | | |
| JP | 11-96364 | 4/1999 | | |
| JP | 11-238077 | 8/1999 | ........... | G06F/17/30 |
| JP | 2000-507754 | 6/2000 | | |
| JP | 2002-543691 | 11/2002 | | |
| KR | 2000-0002320 | 1/2000 | ........... | F25D/19/00 |
| WO | WO 00/65839 | * 11/2000 | ............ | H04N/7/24 |

OTHER PUBLICATIONS

Chua et al., Fast signature based color spatial image retrieval, IEEE 0–8186–7819–4/97, 362–369.*
Tan, An evaluation of color–spatial retrieval techniques, IEEE 0–7803–3676–3/97, 1078–1082.*
Hsu et al. An integrated color–spatial approach to content based image retrieval, ACM 0–89791–751–0/95/1.*
Stefania Ardizzoni, et al.; "Windsurf: Region–Based Image Retrieval Using Wavelets"; Published: 1996; pp. 167–173.
Yining Deng, et al; "An Efficient Low–Dimensional Color Indexing Scheme for Region–Based Image Retrieval", Published: 1999; vol. 6; pp. 3017–3020.
Scharcanski, J. et al.; "Colour Quantisation for Colour Texture Analysis" IEE Proceedings–E, Computers & Digital Techniques, Institution of Electrical Engineers. Stevenage, GB, vol. 140, No. 2, Mar. 1, 1993, pp. 109–114.

(List continued on next page.)

Primary Examiner—Leo Boudreau
Assistant Examiner—Ishrat Sherali
(74) Attorney, Agent, or Firm—Sughrue Mion, PLLC

(57) ABSTRACT

A color image processing method for retrieving a color feature descriptor for describing color features of an image is provided. The color image processing method includes the steps of (a) obtaining color vectors of an input image, (b) classifying the color vectors to obtain dominant colors of the input image and the ratios thereof, and (c) representing the dominant colors and the ratios thereof as a color feature descriptor of the input image. The color image processing method is applied to an object-based image processing method, thereby allowing fast search and retrieval of multimedia contents.

41 Claims, 4 Drawing Sheets

OTHER PUBLICATIONS

Babu, Phanedra G, et al.: "Colour Indexing for Efficient Image Retrieval" Multimedia Tools and Applications, Kluwer Academic Publishers, Boston, US, vol. 1, No. 4, Nov. 1, 1995, pp. 327–348.

Bergeaud, F. et al.: "Matching Pursuit of Images" Proceedings of the International Conference on Image Processing. (ICIP). Washington, Oct. 23–26, 1995, Los Alamitos, IEEE Comp. Soc. Press, US vol. 3, Oct. 23, 1995 pp. 53–56.

* cited by examiner

COLOR IMAGE PROCESSING METHOD AND APPARATUS THEREOF

REFERENCE TO RELATED APPLICATION

This application claims the benefit of U.S. provisional application Ser. No. 60/118,742, filed Feb. 5, 1999, the disclosure of which is incorporated herein by reference.

BACKGROUND OF THE INVENTION

1. Field of the Invention

The present invention relates to a color image processing method and apparatus, and more particularly, to a color image processing method for retrieving a color feature descriptor used in indexing and searching a color image.

2. Description of the Related Art

Among visual features for describing multi-media contents, color is the most dominant feature. According to conventional color image processing methods, a color histogram is used for expressing the color information of an image. However, the conventional color image processing methods using a color histogram consisting of 1024 bins have drawbacks in that the computational complexity of image processing steps for describing an image is high and much processing time is required.

SUMMARY OF THE INVENTION

To solve the above problem, it is an object of the present invention to provide a color image processing method which can reduce the computational complexity and processing time.

It is another object of the present invention to provide a computer readable medium having a program executable by a computer to perform the color image processing method.

It is still another object of the present invention to provide a color image processing apparatus for performing the color image processing method.

A feature of the present invention is embodied by a color image processing method which includes the steps of (a) obtaining color vectors of an input image, (b) classifying the color vectors to obtain dominant colors of the input image and the ratios thereof, and (c) representing the dominant colors and the ratios thereof as a color feature descriptor of the input image.

The color vectors are preferably quantized color vectors and the ratios are preferably percentiles.

The color image processing method may further include the step of (d) combining the quantized color vectors and the color feature descriptor and representing the combination result as the whole image.

Also, before the step (b), there may be further included the step of performing a predetermined filtering process for smoothing of the input image. Alternatively, before the step (b), the method may further include the step of performing a predetermined filtering process for noise removal of the input image.

Also, before the step (b), the method may further include the steps of analyzing the probability of pixels in the filtered image being noisy pixels and applying appropriate weights thereto, and applying a general Lloyd algorithm to the color vectors corresponding to the weighted pixels to perform color quantization.

According to another aspect of the present invention, there is provided a color image processing method for retrieving a color feature descriptor for describing color features of an image, the method including the steps of (a) segmenting an input image into a plurality of regions, (b) obtaining color vectors for the segmented regions, (c) classifying the color vectors to obtain dominant colors of the input image and the ratios thereof, and (d) representing the dominant colors and the ratios thereof as a color feature descriptor of the input image.

The present invention also provides a computer readable medium having program codes executable by a computer to perform a color image processing method for retrieving a color feature descriptor for describing color features of an image, the method comprising the steps of (a) segmenting an input image into a plurality of regions, (b) obtaining color vectors for the segmented regions, (c) classifying the color vectors to obtain dominant colors of the input image and the ratios thereof, and (d) representing the dominant colors and the ratios thereof as a color feature descriptor of the input image.

According to another aspect of the present invention, there is provided a color image processing apparatus for retrieving a color feature descriptor for describing color features of an image, including a color vector retrieving unit for receiving pixel value data of an input image and retrieving color vectors for a predetermined color coordinate system, and a color feature descriptor generating unit for obtaining the percentiles of dominant colors represented by the color vectors when the color vectors are all received and generating and outputting color feature descriptor data containing the information on the dominant colors and the percentiles thereof.

Also, the present invention provides a color image processing apparatus for retrieving a color feature descriptor for describing color features of an image, including a segmenting unit for segmenting an input image into k regions, wherein k is an arbitrary positive integer, and sequentially outputting pixel value data corresponding to the kth region, a color vector retrieving unit for receiving pixel value data of an input image and retrieving color vectors for a predetermined color coordinate system, and a color feature descriptor generating unit for obtaining the percentiles of dominant colors represented by the color vectors when the color vectors are all received and generating and outputting color feature descriptor data containing the information on the dominant colors and the percentiles thereof.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Hereinafter, embodiments of the present invention will be described in detail with reference to the accompanying drawings.

Figure 1:
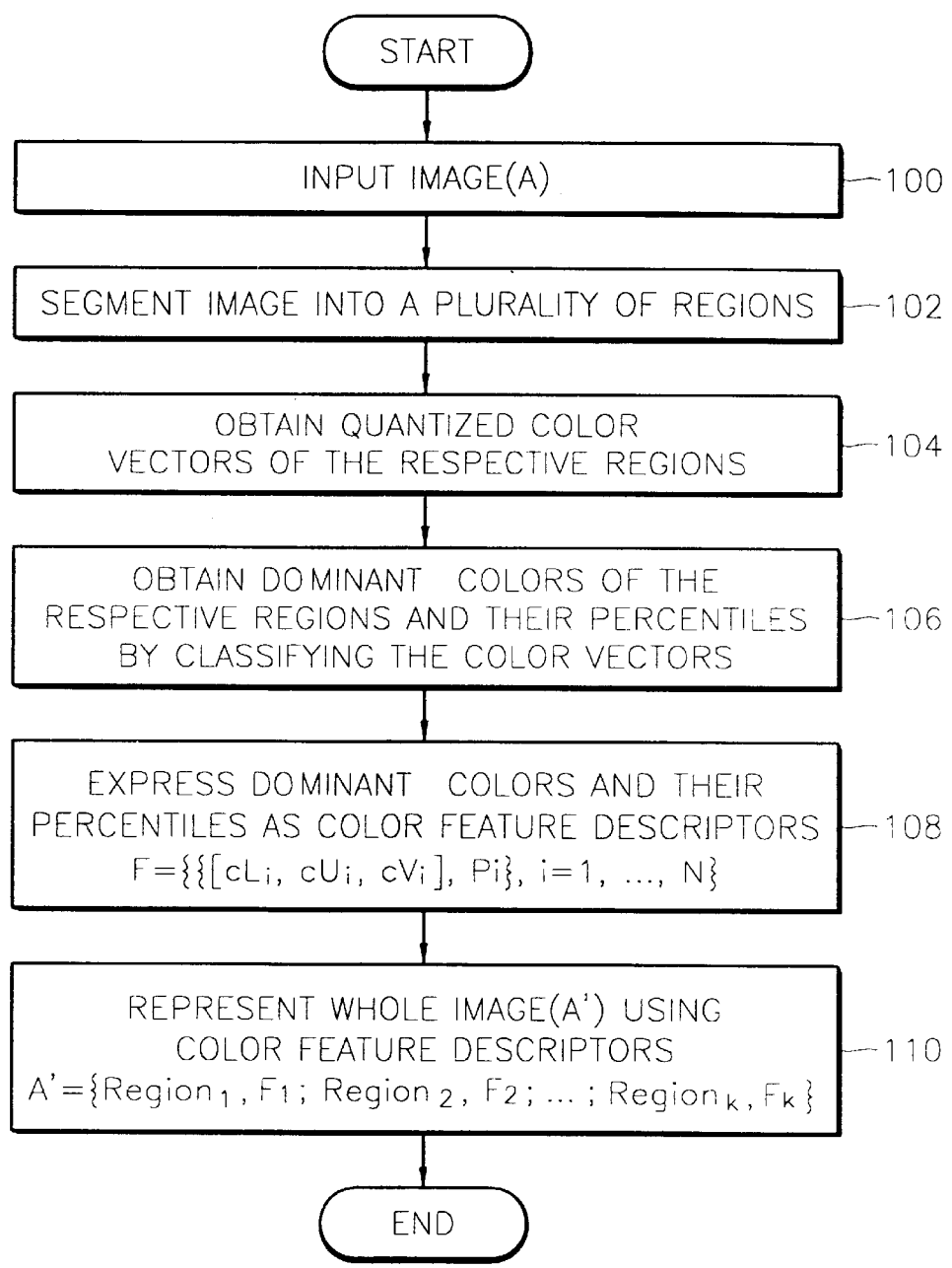
FIG. 1 is a flow diagram showing a color image processing method according to the present invention.
Figure 2:
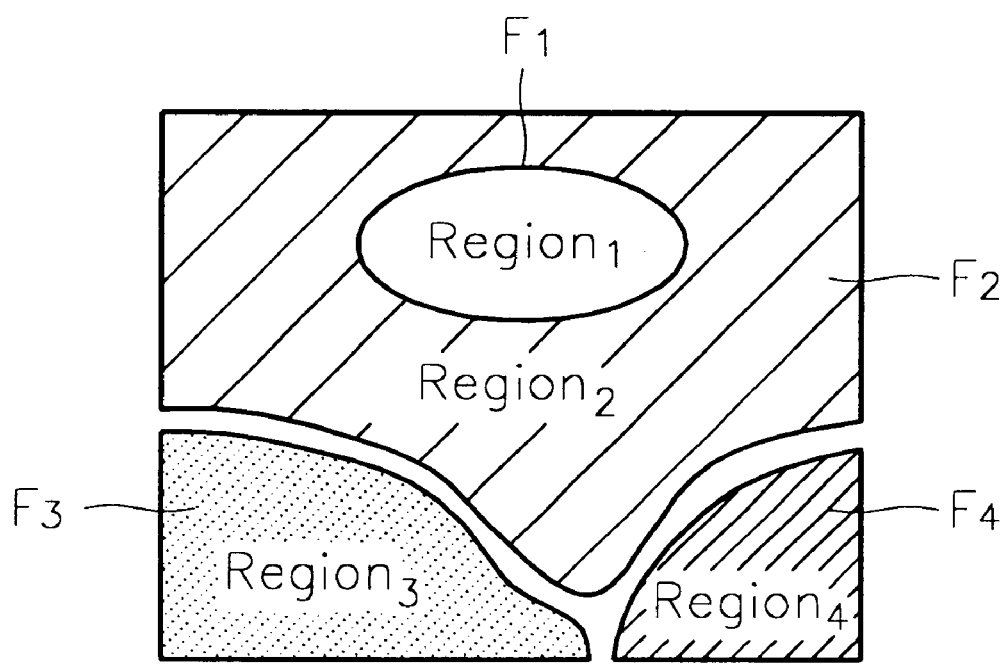
FIG. 2 is a diagram illustrating image segmentation performed in the step 106 of FIG. 1.

Referring to FIG. 1 illustrating a color image processing method according to the present invention, a color image A is input (step 100). The color image is segmented into a plurality of regions $F_1$, $F_2$, $F_3$ and $F_4$ (step 102). The segmentation can be performed based on edge flow, for example. Then, quantized color vectors for the respective regions $F_1$, $F_2$, $F_3$ and $F_4$ are obtained (step 104).

The step of obtaining the quantized color vectors preferably includes the following steps. First, a predetermined filtering step for smoothing and noise removal of an image is performed as a pre-processing step. Next, the probability of pixels in the filtered image being noisy pixels is analyzed to then apply an appropriate weight to the same. The probability of pixels in the filtered image being noisy pixels is obtained by the color distance from neighboring pixels. For example, i pixels, in which i is an arbitrary integer, ranging from a pixel having the minimum color distance are selected among the pixels sorted according to the color distance from a central pixel, and among the selected pixels, the pixel value which has the largest color distance is set to the maximum color distance, which is denoted by T(n). Then, the color vectors of the respective pixels are weighted by exp(−T(n)). exp(−T(n)) is defined by v(n). Next, assuming that the average of T(n) values of all pixels is Tavg, the number N of initial clusters to be used in quantization equals Tavg×an arbitrary constant, e.g., 2. Then, a general Lloyd algorithm is applied to the color vectors corresponding to weighted pixels to quantize the color vectors. First, using the cluster centroid ($c_i$) represented by Expression (1):

$$c_i = \frac{\sum v(n)X(n)}{\sum v(n)} \quad (1)$$

wherein X(n) is the pixel value of the nth pixel among the sorted pixels, and a value of $D_i$ represented by Expression (2) is calculated:

$$D_i = \Sigma v(n)\|X(n)-c_i\|^2 \quad \ldots (2)$$

to then split a cluster having the largest value of $D_i$. This procedure is repeated until N clusters are generated. After N clusters are generated, a general Lloyd algorithm is performed. When the general Lloyd algorithm is performed, the cluster centroid is calculated by the Expression (1) to perform updating.

Next, clusters having similar color vectors are agglomerated by performing agglomerative clustering. Agglomerative clustering is disclosed by R. O. Duda and P. E. Hart in "Pattern Classification and Scene Analysis, John Wiley and Sons, New York, 1973," which will not be described in detail in this specification.

Then, the color vectors are classified and dominant colors represented by color vectors [$cL_i$, $cU_i$, $cV_i$] and their percentiles $P_i$ are obtained (step 106). Here, i denotes the arbitrary serial number of primary regions, ranging from 1 through N, L, U and V denote coordinates of the CIE LUV color coordinate system. The percentiles $P_i$ are expressed by decimals. The sum of the percentiles $P_i$ for i regions is 1 as represented by Expression (3):

$$\sum_{i=1}^{N} P_i = 1 \quad (3)$$

Next, the dominant colors represented by color vectors [$cL_i$, $cU_i$, $cV_1$,] and their percentiles $P_i$ are expressed as the color feature descriptor of a pertinent region obtained (step 108). In other words, the color feature descriptor F can be represented by Expression (4):

$$F=\{\{[cL_i,cU_i,cV_i],P_i\},i=1,\ldots,N\} \quad \ldots (4)$$

wherein N is a predetermined positive integer. The color feature descriptor can be referred to as a variable-bin color histogram.

By combining pixel value data in the kth region, i.e., $Region_k$ and color feature descriptor data of this region, i.e., $F_k$, the whole image A' is represented by Expression (5):

$$A'=\{Region_1, F_1; Region_2, F_2; \ldots ; Region_k, F_k\} \quad \ldots (5)$$

wherein k is a predetermined positive integer representing the number of segmented regions of the image A (step 110).

The color feature descriptor retrieved by the color image processing method according to the present invention is compactly represented by a small number of numbers with respect to one region. The compact representation of the color feature descriptor can remarkably reduce the computational complexity. This allows fast search and retrieval of multi-media based contents. The color image processing method according to the present invention can be applied to an object-based image processing method such as MPEG-7.

The color image processing method is programmable by a computer program. Codes and code segments constituting the computer program can be easily derived by a computer programmer in the art. Also, the program is stored in computer readable media and is readable and executable by the computer, thereby embodying the color image processing method. The media include magnetic recording media, optical recording media, carrier wave media, and the like.

Figure 3:
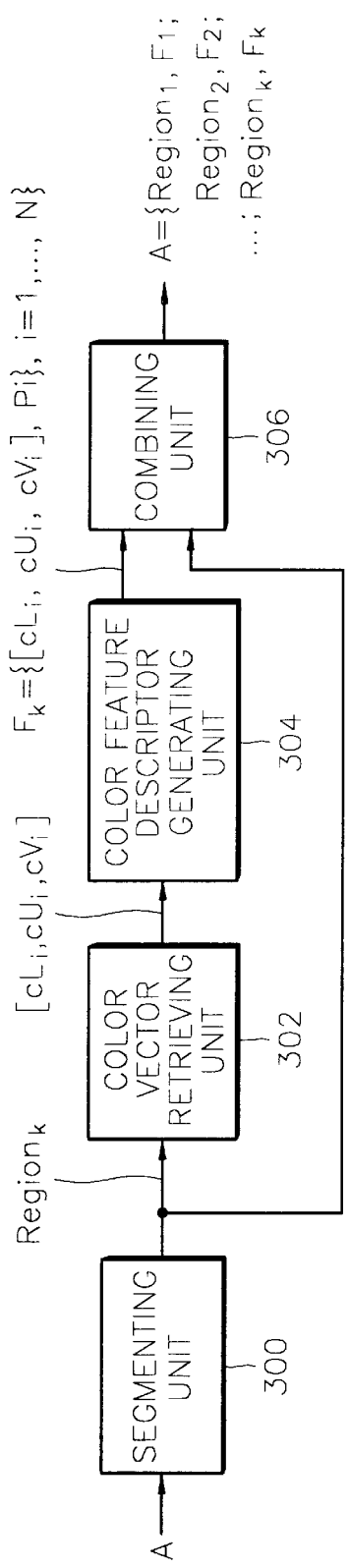
FIG. 3 is a block diagram of a color image processing apparatus according to the present invention.

Also, the color image processing method can be implemented on a color image processing apparatus. FIG. 3 is a block diagram of a color image processing apparatus according to the present invention. Referring to FIG. 3, the color image processing apparatus includes a segmenting unit 300, a color vector retrieving unit 302, a color feature descriptor generating unit 304 and a combining unit 306.

In the operation of the color image processing apparatus, the segmenting unit 300 segments an input image A into k regions and sequentially outputs pixel value data $Region_k$ in the kth region. The color vector retrieving unit 302 receives the pixel value data $Region_k$ in the kth region and retrieves the color vectors [$cL_i$, $cU_i$, $cV_i$]. When i color vectors [$cL_i$, $cU_i$, $cV_i$] are all received, the color feature descriptor generating unit 304 obtains the percentiles $P_i$ of dominant colors represented by the color vectors [$cL_i$, $cU_i$, $cV_i$], and generates and outputs color feature descriptor data $F_k$. The color feature descriptor data $F_k$ includes information on the dominant colors represented by the color vectors [$cL_i$, $cU_i$, $cV_i$] and their percentiles $P_i$.

In order to obtain the percentiles $P_i$ of the respective colors, it is more preferable that color quantization is performed within each segmented region. Thus, the color image processing apparatus preferably further includes a quantizing unit (not shown). The color image processing apparatus preferably further includes a filtering unit (not shown) for performing a predetermined filtering process for smoothing and noise removal of the input image. The quantizing unit analyzes the probability of pixels in the filtered image being noisy pixels, applies an appropriate weight thereto and quantizes the color vectors corresponding to the weighted pixels by a general Lloyd algorithm.

The combining unit 306 combines pixel value data in the kth region, i.e., $Region_k$ and color feature descriptor data of this region, i.e., $F_k$, to output the processed image A'. The color image processing apparatus according to the present invention can be applied to an object-based image processing method such as MPEG-7. Also, in the color image processing apparatus according to the present invention, expressing a color image using dominant colors of the image can also be applied to various other fields besides the field of color image processing.

Figure 4A:
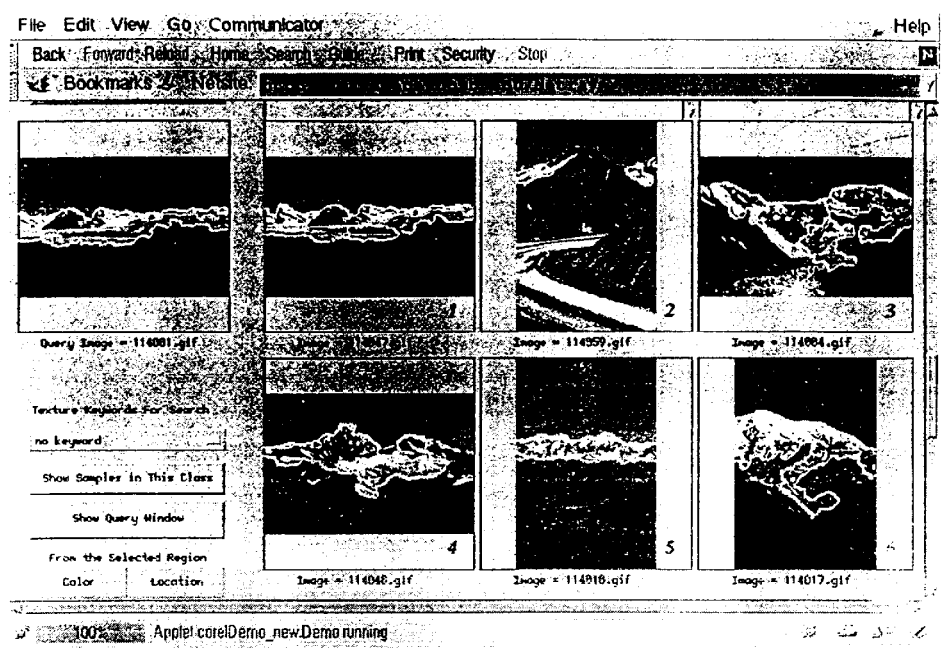
FIGS. 4A and 4B show the result obtained by performing a region-based search with respect to images indexed by a computer program based on the color image processing method according to the present invention.
Figure 4B:
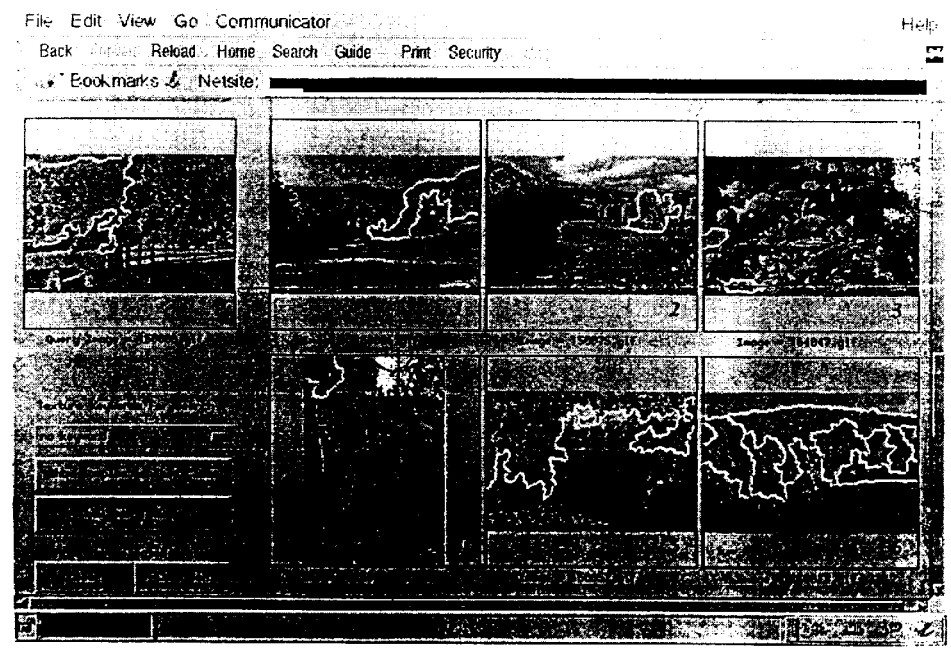

FIGS. 4A and 4B show the result obtained by performing a region-based search with respect to images indexed by a computer program based on the color image processing method according to the present invention. Referring to FIGS. 4A and 4B, a region surrounded by a white-line in the query image at the left side of the drawing is a query region. Also, images at the right side of the drawing are searched images in images indexed by a computer program based on the color image processing method according to the present invention. Searched images have at least one region having the same color feature of the query region of query image. It can be seen that searched images have at least one region surrounded by a white line, and that the region in the searched image is similar to the query region.

As described above, the color image processing method according to the present invention is applied to an object-based image processing method, thereby allowing fast search and retrieval of multi-media contents.

What is claimed is:

1. A color image processing method for retrieving a color feature descriptor for describing color features of an image, the method comprising the steps of:
   (a) obtaining color vectors of an input image;
   (b) obtaining at least one class of the color vectors by classifying the color vectors based on a distribution of values of the color vectors; and
   (c) obtaining at least one dominant color and ratio thereof, from the at least one class, to use the at least one dominant color and the ratios thereof as a color feature descriptor of the input image.

2. The color image processing method according to claim 1, wherein the color vectors are quantized color vectors.

3. The color image processing method according to claim 1, wherein the ratios are percentiles.

4. The color image processing method according to claim 1, further comprising the step of (d) combining the color vectors and the color feature descriptor and representing the combination result as the whole image.

5. The color image processing method according to claim 4, wherein the color vectors are quantized color vectors.

6. The color image processing method according to claim 4, wherein the ratios are percentiles.

7. The color image processing method according to claim 1, further comprising the step of (d) combining the quantized color vectors and the color feature descriptor and representing the combination result as the whole image.

8. The color image processing method according to claim 1, before the step (b), further comprising the step of performing a predetermined filtering process for smoothing of the input image.

9. The color image processing method according to claim 1, before the step (b), further comprising the step of performing a predetermined filtering process for noise removal of the input image.

10. The color image processing method according to claim 1, before the step (b), further comprising the step of performing a predetermined filtering process for smoothing and noise removal of the input image.

11. A color image processing method for retrieving a color feature descriptor for describing color features of an image, the method comprising the steps of:
   (a) obtaining color vectors of an input image;
   (b) classifying the color vectors to obtain dominant colors of the input image and the ratios thereof;
   (c) representing the dominant colors and ratios thereof as a color feature descriptor of the input image; and
   before the step (b), further comprising the steps of:
      analyzing the probability of pixels in the filtered image being noisy pixels and applying appropriate weights thereto; and
      applying a general Lloyd algorithm to the color vectors corresponding to the weighted pixels to perform color quantization.

12. A color image processing method for retrieving a color feature descriptor for describing color features of an image, the method comprising the steps of:
   (a) segmenting an input image into a plurality of regions;
   (b) obtaining color vectors for the segmented regions;
   (c) classifying the color vectors to obtain dominant colors of the input image and ratios thereof;
   (d) representing the dominant colors and the ratios thereof as a color feature descriptor of the input image; and
   before the step (b), further comprising the step of:
      analyzing the probability of pixels in the filtered image being noisy pixels and applying appropriate weights thereto; and
      applying a general Lloyd algorithm to the color vectors corresponding to the weighted pixels to perform color quantization.

13. The color image processing method according to claim 12, wherein the color vectors are quantized color vectors.

14. The color image processing method according to claim 12, wherein the ratios are percentiles.

15. The color image processing method according to claim 12, further comprising the step of (e) combining the color vectors for the segmented regions and the color feature descriptor and representing the combination result as the whole image.

16. The color image processing method according to claim 12, before the step (b), further comprising the step of performing a predetermined filtering process for smoothing of the input image.

17. The color image processing method according to claim 12, before the step (b), further comprising the step of performing a predetermined filtering process for noise removal of the input image.

18. The color image processing method according to claim 12, before the step (b), further comprising the step of performing a predetermined filtering process for smoothing and noise removal of the input image.

19. The color image processing method according to claim 12, before the step (b), further comprising the step of performing a predetermined filtering process for smoothing of the segmented regions.

20. The color image processing method according to claim 12, before the step (b), further comprising the step of performing a predetermined filtering process for noise removal of the segmented regions.

21. The color image processing method according to claim 12, before the step (b), further comprising the step of performing a predetermined filtering process for smoothing and noise removal of the segmented regions.

22. A computer readable medium having program codes executable by a computer to perform a color image processing method for retrieving a color feature descriptor for describing color features of an image, the method comprising the steps of:

(a) segmenting an input image into a plurality of regions;

(b) obtaining color vectors for the segmented regions;

(c) classifying the color vectors to obtain dominant colors of the input image and ratios thereof;

(d) representing the dominant colors and the ratios thereof as a color feature descriptor of the input image; and (e) combining the color vectors for the segmented regions and the color feature descriptor and representing the combination result as the whole image.

23. A color image processing apparatus for retrieving a color feature descriptor for describing color features of an image, comprising:

a color vector retrieving unit for receiving pixel value data of an input image and retrieving color vectors for a predetermined color coordinate system;

a color feature descriptor generating unit for obtaining at least one class of the color vectors by classifying the color vectors based on a distribution of values of the color vectors, obtaining at least one dominant color and ratio thereof, from the at least one class, and generating and outputting color feature descriptor data containing the information on the at least one dominant color and the ratio thereof; and a combining unit for combining pixel value data and color feature descriptor data to output a processed image.

24. A color image processing apparatus for retrieving a color feature descriptor for describing color features of an image, comprising:

a segmenting unit for segmenting an input image into k regions, wherein k is an arbitrary positive integer, and sequentially outputting pixel value data corresponding to the kth region;

a color vector retrieving unit for receiving pixel value data of an input image and retrieving color vectors for a predetermined color coordinate system;

a color feature descriptor generating unit for obtaining percentiles of dominant colors represented by the color vectors when the color vectors are all received and generating and outputting color feature descriptor data containing the information on the dominant colors and the percentiles thereof; and a combining unit for combining pixel value data corresponding to the kth region and color feature descriptor data of the corresponding region, with respect to all the k segmented regions, to output a processed image.

25. The color image processing apparatus according to claim 24, further comprising a quantizing unit for performing color quantization in the segmented region.

26. The color image processing apparatus according to claim 25, wherein the quantizing unit analyzes the probability of pixels in the filtered image being noisy pixels and applying appropriate weights thereto, and applies a general Lloyd algorithm to the color vectors corresponding to the weighted pixels to perform color quantization.

27. The color image processing apparatus according to claim 24, further comprising a quantizing unit for performing color quantization in the segmented regions.

28. The color image processing apparatus according to claim 27, wherein the quantizing unit analyzes the probability of pixels in the filtered image being noisy pixels and applies appropriate weights thereto, and applies a general Lloyd algorithm to the color vectors corresponding to the weighted pixels to perform color quantization.

29. The color image processing apparatus according to claim 24, further comprising a filtering unit for performing a predetermined filtering process for smoothing of an input image.

30. The color image processing apparatus according to claim 24, further comprising a filtering unit for performing a predetermined filtering process for noise removal of an input image.

31. The color image processing apparatus according to claim 24, further comprising a filtering unit for performing a predetermined filtering process for smoothing and noise removal of an input image.

32. The color image processing apparatus according to claim 29, further comprising a quantizing unit for performing color quantization in the segmented regions.

33. The color image processing apparatus according to claim 30, further comprising a quantizing unit for performing color quantization in the segmented regions.

34. The color image processing apparatus according to claim 31, further comprising a quantizing unit for performing color quantization in the segmented regions.

35. The color image processing apparatus according to claim 32, wherein the quantizing unit analyzes the probability of pixels in the filtered image being noisy pixels and applies appropriate weights thereto, and applies a general Lloyd algorithm to the color vectors corresponding to the weighted pixels to perform color quantization.

36. The color image processing apparatus according to claim 33, wherein the quantizing unit analyzes the probability of pixels in the filtered image being noisy pixels and applies appropriate weights thereto, and applies a general Lloyd algorithm to the color vectors corresponding to the weighted pixels to perform color quantization.

37. The color image processing apparatus according to claim 34, wherein the quantizing unit analyzes the probability of pixels in the filtered image being noisy pixels and applies appropriate weights thereto, and applies a general Lloyd algorithm to the color vectors corresponding to the weighted pixels to perform color quantization.

38. The color image processing apparatus according to claim 35, further comprising a combining unit for combining pixel value data corresponding to the kth region and color feature descriptor data of the corresponding region, with respect to all the k segmented regions, to output a processed image.

39. The color image processing apparatus according to claim 36, further comprising a combining unit for combining pixel value data corresponding to the kth region and color feature descriptor data of the corresponding region, with respect to all the k segmented regions, to output a processed image.

40. The color image processing apparatus according to claim 37, further comprising a combining unit for combining pixel value data corresponding to the kth region and color feature descriptor data of the corresponding region, with respect to all the k segmented regions, to output a processed image.

41. A color image processing method according to claim 12, wherein the color image is represented using dominant colors of the color image and the percentiles thereof.

* * * * *